(12) United States Patent
Hoch

(10) Patent No.: US 9,429,443 B2
(45) Date of Patent: Aug. 30, 2016

(54) METHOD AND SYSTEM FOR DETERMINING PARAMETERS OF A MODEL FOR THE LONGITUDINAL GUIDANCE AND FOR THE DETERMINATION OF A LONGITUDINAL GUIDE FOR A VEHICLE

(71) Applicant: VOLKSWAGEN AG, Wolfsburg (DE)

(72) Inventor: Nicklas Hoch, Hannover (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 14/573,324

(22) Filed: Dec. 17, 2014

(65) Prior Publication Data

US 2015/0168157 A1 Jun. 18, 2015

(30) Foreign Application Priority Data

Dec. 17, 2013 (DE) .................. 10 2013 226 195

(51) Int. Cl.
*B60K 31/00* (2006.01)
*B60W 30/14* (2006.01)
(Continued)

(52) U.S. Cl.
CPC ........ *G01C 21/3469* (2013.01); *B60W 30/143* (2013.01); *B60W 30/18154* (2013.01); *B60W 40/08* (2013.01); *B60W 40/107* (2013.01); *B60W 50/0097* (2013.01); *G01C 21/3484* (2013.01);
(Continued)

(58) Field of Classification Search
CPC .. B60K 31/00; G01C 21/3469; G01C 21/26; G08G 1/0104; B60W 30/14; B60W 30/18; F16H 59/66

USPC .......................................... 701/94, 400, 119
See application file for complete search history.

(56) References Cited

U.S. PATENT DOCUMENTS 5,798,949 A * 8/1998 Kaub ..................... G08G 1/164
703/6
8,989,917 B2 * 3/2015 Kumar .................... B61L 3/006
701/19

(Continued)

FOREIGN PATENT DOCUMENTS

DE         10343178 A1     4/2005
DE    102007036794 A1 *    2/2009    ............. G01C 21/26
(Continued)

OTHER PUBLICATIONS

Search Report for European Patent Application No. 14196354.6; Jun. 2, 2015.

*Primary Examiner* — Tuan C. To
*Assistant Examiner* — Yuri Kan
(74) *Attorney, Agent, or Firm* — Barnes & Thornburg LLP

(57) ABSTRACT

A method to detect a section of a route of the vehicle using sensors, an actual speed-time profile when driving through the section, and parameters based on the actual speed-time profile. The method includes determining a route of the vehicle, wherein the route runs from a current position of the vehicle to a target position of the route; dividing the route into sections, wherein each of the sections is assigned to a predetermined section type and is assigned a reference speed-time profile which is dependent on the section type of the respective section; determining an expected speed-time profile for each of the sections in that the reference speed-time profile of the respective section is provided with parameters which are dependent on a current driver to determine the expected speed-time profile of the respective section; and determining the longitudinal guidance using the expected speed-time profiles of the sections of the route.

12 Claims, 4 Drawing Sheets

(51) Int. Cl.
*G01C 21/34* (2006.01)
*B60W 40/107* (2012.01)
*B60W 40/08* (2012.01)
*G08G 1/01* (2006.01)
*G08G 1/0967* (2006.01)
*B60W 50/00* (2006.01)
*B60W 30/18* (2012.01)

(52) U.S. Cl.
CPC ........... *G08G 1/0112* (2013.01); *G08G 1/0129* (2013.01); *G08G 1/096716* (2013.01); *G08G 1/096758* (2013.01); *G08G 1/096775* (2013.01); *B60W 2550/141* (2013.01); *B60W 2550/143* (2013.01); *B60W 2550/22* (2013.01); *B60W 2550/308* (2013.01); *B60W 2550/402* (2013.01); *B60W 2720/103* (2013.01)

(56) References Cited

U.S. PATENT DOCUMENTS

| | | | |
|---|---|---|---|
| 2008/0004789 | A1 | 1/2008 | Horvitz et al. |
| 2011/0106416 | A1 * | 5/2011 | Scofield ............... G08G 1/0104 701/119 |
| 2015/0191170 | A1 * | 7/2015 | Johansson ............ B60K 31/00 701/94 |
| 2015/0310145 | A1 * | 10/2015 | Nica ................... G01M 17/007 703/8 |

FOREIGN PATENT DOCUMENTS

| | | | | |
|---|---|---|---|---|
| DE | 102009039774 | A1 | 3/2011 | |
| DE | 102010047080 | A1 | 4/2012 | |
| DE | 102010054077 | A1 * | 6/2012 | ......... B60W 50/0097 |
| DE | 1020100054077 | A1 | 6/2012 | |
| DE | 102011006741 | A1 * | 10/2012 | ............. F16H 59/66 |
| DE | 102012003292 | A1 | 6/2013 | |
| DE | 102013009945 | A1 * | 12/2013 | ........ B60W 50/0097 |
| EP | 1172631 | A1 | 1/2002 | |
| EP | 2224212 | A1 | 9/2010 | |
| EP | 2669632 | A2 | 12/2013 | |

* cited by examiner

| Vs/Vz | 0 | 10 | 20 | ... |
|---|---|---|---|---|
| 0 | | $A_{0-10}$ | $A_{0-20}$ | |
| 10 | $A_{10-0}$ | | $A_{10-20}$ | |
| 20 | $A_{20-0}$ | $A_{20-10}$ | | |
| ... | | | | |

| V | 0 | 10 | 20 | ... |
|---|---|---|---|---|
| | | $A_{10}$ | $A_{20}$ | |

METHOD AND SYSTEM FOR DETERMINING PARAMETERS OF A MODEL FOR THE LONGITUDINAL GUIDANCE AND FOR THE DETERMINATION OF A LONGITUDINAL GUIDE FOR A VEHICLE

PRIORITY CLAIM

This patent application claims priority to German Patent Application No. 10 2013 226 195.0, filed 17 Dec. 2013, the disclosure of which is incorporated herein by reference in its entirety.

SUMMARY

Disclosed embodiments relate to a method and to a system for determining parameters of a model of predicted longitudinal guidance of a vehicle and to a method and a system for determining predicted longitudinal guidance for a vehicle, in particular, on the basis of the method and system mentioned above.

BRIEF DESCRIPTION OF THE DRAWINGS

In the text which follows, the present invention will be described in detail by means of disclosed embodiments with reference to the figures. In the drawings.

DETAILED DESCRIPTION OF THE DISCLOSED EMBODIMENTS

Figure 1:
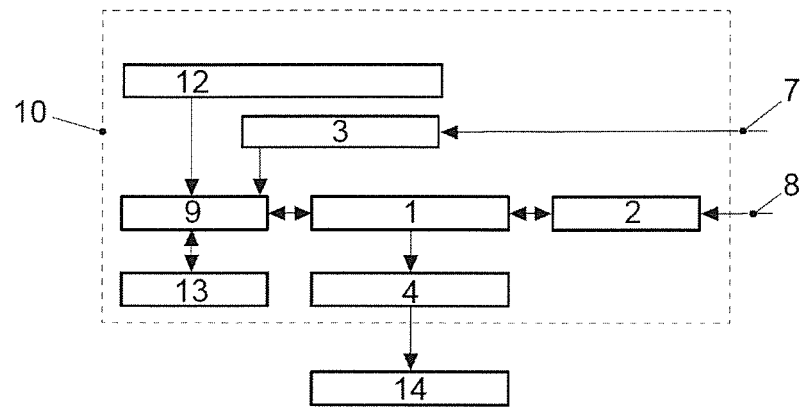
FIG. 1 is a schematic illustration of components of a vehicle.

Disclosed embodiments provide a method for determining parameters of a model of predicted longitudinal guidance of a vehicle. In this context, the method comprises the following steps:

detecting a section of a route of the vehicle by means of sensors in the vehicle and, if appropriate, by means of additional information such as, for example, map data. In this context it is also possible to perform processing with what is referred to as predictive route data which includes a portion of the map information for the vehicle route lying ahead. For example, on the basis of a GPS receiver or a camera it is possible to detect the current position of the vehicle and therefore the current section of the route which can be assigned to a specific section type.

When the section is driven through with the vehicle, an actual speed-time profile of the vehicle is detected. For this purpose, the start and the end of the section is detected, for example, with the previously described sensors, and the speed of the vehicle is recorded over time by means of a speedometer in the vehicle in this time period in which the section is driven through.

The parameters of the model are determined or adapted as a function of the actual speed-time profile.

In this context, the section has a specific reference speed-time profile which depends on the section type of the detected section of the route. The parameters are determined by the step of determining the parameters in such a way that an expected speed-time profile can be determined on the basis of this reference speed-time profile. For this purpose, the parameters can, for example, be determined or adapted in such a way that the reference speed-time profile is adapted to the previously detected, actual speed-time profile using the parameters. In other words, the parameters are determined or adapted on the basis of the actual speed-time profile in such a way that an expected speed-time profile which is to be determined in future with the parameters corresponds as well as possible to the reality which was detected on the basis of the actual speed-time profile.

The reference speed-time profile assigns a reference speed, in particular, to the respective section of the route as a function of the section type overall or section by section. This reference speed corresponds, for example, to a speed at which an average driver would drive through the corresponding section under average conditions. By using the parameters, the reference speed-time profile can be adapted, as it were, to the driver and to the context (driving conditions), to determine the expected speed-time profile of any section to be driven through in future.

The parameters are determined here, in particular, as a function of the driver and/or as a function of the section type. For example there can be a parameter set for each driver and/or each section type, wherein that parameter set or those parameters which are assigned to the current driver and/or the section type of the detected section are determined with the method.

In this way, the model of the predicted longitudinal guidance can be adapted very precisely to the actual longitudinal guidance of the vehicle, since the method can take into account the driver and/or the type of the respective section of the route.

Disclosed embodiments also relate to a method for determining predicted longitudinal guidance for a vehicle. This method for determining the predicted longitudinal guidance comprises the following steps:

Determining a route of the vehicle. In this context, the route runs from the current position of the vehicle to a target position of the route which can be predefined, for example, on the basis of a specific input means of the vehicle.

Dividing the route into sections. Here, each of these sections is assigned to a specific section type or has this section type. Each section type is in turn assigned a predetermined reference speed-time profile or has this reference speed-time profile. For this reason, by means of the section type, each section of the route is also assigned a specific reference speed-time profile.

Determining an expected speed-time profile for each of the sections, in that the reference speed-time profile of the respective section is provided with parameters which depend on the respective driver, as a result, to determine the expected speed-time profile of the respective section. In other words, there are parameters which are dependent on the driver and which were learnt, for example, with the previously described, inventive method for determining the parameters of a model of predicted longitudinal guidance and with which the expected speed-time profile of the respective section is determined starting from the respective reference speed-time profile of the respective section.

Determining the predicted longitudinal guidance on the basis of the expected speed-time profiles of all the sections of the route. For example the predicted longitudinal guidance of the vehicle is determined by juxtaposing the speed-time profiles of all the sections, as it were, in the corresponding sequence of the sections.

Through the division of the route into various sections of different section types, the conditions of a route can be taken into account in a virtually optimum fashion in the determination of the predicted longitudinal guidance. Furthermore, the dependence of the parameters on the respective driver permits the respective properties of the driver to be advantageously taken into account in the determination of the predicted longitudinal guidance.

The parameters are advantageously dependent not only on the driver but also on the respective section type, with the result that a parameter set which comprises corresponding parameters is present for each driver for each section type.

Since the parameters depend not only on the driver but also on the section type, the properties of the respective driver which are dependent on the respective section type can also advantageously be taken into account in the determination of the predicted longitudinal guidance.

The determination of the expected speed-time profile comprises, in particular, the following steps:

Detecting a current section of the route of the vehicle by means of at least one sensor of the vehicle. In this step, the method detects what section of the route the vehicle is currently located in, using, for example, a GPS receiver.

Detecting an actual speed-time profile of the vehicle when driving through the current section. Since, for example, the data of a speedometer of the vehicle are recorded over time, the actual speed-time profile is detected and stored when driving through the current section.

Adapting the parameters as a function of the actual speed-time profile. In this step, the parameters are determined or adapted on the basis of the actual speed-time profile in such a way that by means of the adapted parameters, on the basis of the reference speed-time profile of the respective section or section type, an expected speed-time profile which is to be determined in future for a section of this section type corresponds better to the reality than was the case before the adaptation.

Since the actual speed-time profile is respectively detected for the current section of the route and the parameters are adapted as a function thereof, the disclosed embodiment learns, as it were, how the respective driver behaves in a respective section type. As a result, the determination of the predicted longitudinal guidance can be advantageously improved.

There may be the following section types:

The intersection section type:

The intersection section type describes a section of the route which runs via a road intersection. Here, a section of this section type begins a predetermined distance before the intersection, at the start of which the vehicle generally begins to reduce the speed of the vehicle owing to the intersection. The section of this section type ends a further predetermined distance after the intersection at the end of which the vehicle has generally ended its acceleration after the intersection, and has a speed which is dependent on a maximum speed which is valid after the intersection.

The intersection section type can be divided into subtypes which depend on whether the route running across the intersection linearly is a right-handed bend or left-handed bend.

The reference speed-time profile of the intersection section type is accordingly predefined, in particular, by its subtypes and current intersection traffic (number and behavior of extraneous vehicles in the intersection region). For the right-handed bend or left-handed bend subtypes it is also possible to take into account the bend radius to determine the speed at which the vehicle drives through the intersection according to the reference speed-time profile.

The traffic light section type:

The traffic light section type describes a section of the route on which a traffic light system is located. Similarly to the intersection section type, a section of the traffic light section type begins a predetermined distance before the traffic light system at the start of which the vehicle generally begins to reduce the speed of the vehicle owing to the traffic light system. A section of the traffic light system type ends a further predetermined distance after the traffic light system, at the end of which the vehicle has generally ended its acceleration after the traffic light system, and has a speed which is dependent on a maximum speed which is valid after the traffic light system.

If the traffic light system is located at an intersection, the traffic light section type can also be divided into subtypes which depend on whether the route running across the intersection linearly is a right-handed bend or left-handed bend.

The reference speed-time profile of the traffic light section type is predefined similarly to the intersection section type, in particular by means of its subtypes and current traffic light traffic (number and behavior of extraneous vehicles in the traffic light region). For the right-handed bend or left-handed bend subtypes, the bend radius can be taken into account to determine the speed at which the vehicle crosses the intersection in accordance with the reference speed-time profile. On the basis of the traffic light phase period, the time period during which the vehicle remains in a stationary state at the traffic light according to the reference speed-time profile can be determined.

The "unimpeded travel" section type:

This section type describes a section of the route on which the vehicle can travel essentially unimpeded, for example by other vehicles (or by intersections or traffic light systems). The speed of the vehicle on a section of this section type depends here on the valid maximum speed, with the result that the reference speed-time profile is defined, in particular, by the valid maximum speed.

The traffic section type:

This section type describes a section of the route which, although it does not have any intersections or traffic light systems, is a route on which the vehicle is impeded by other vehicles and therefore the speed of the vehicle depends, for example, on the traffic density according to the reference speed-time profile.

It is to be noted that the section types described above are defined, in particular, in such a way that the route can be divided completely only into sections which each have one of these section types. In other words, there is no section of the route which cannot be assigned to one of these section types.

Both disclosed methods can advantageously provide better results the more section types there are, since as a result corresponding particular features of the route can be mapped more precisely.

In both disclosed methods there may be the following parameters or types of parameters:

Offset Speed

This parameter defines a deviation from a constant speed within the reference speed-time profile for the respective section. For example, in the case of the section of the "unimpeded travel" section type, this parameter can indicate the deviation from the permitted maximum speed for the respective driver.

Transition Acceleration

For a transition from a first speed to a second speed of the vehicle, which is present within the reference speed-time profile, this parameter determines the acceleration which is dependent, in particular, on the driver, to accelerate the vehicle from the first speed to the second speed. In this context, the parameter or the transition acceleration can also assume negative values if the second speed is lower than the first speed or is, for example, 0 km/h.

With these two parameters it is advantageously possible, on the one hand, to map the braking and acceleration behavior of the respective driver and the compliance with a predefined maximum speed, to optimize the determination of the predicted longitudinal guidance.

In addition to the dependence on the respective driver or the dependence on the respective section type, the parameters can also be dependent on further information items which are listed below:

An environmental condition which applies when the vehicle is traveling on the respective section of the route.

These environmental conditions can comprise, for example, a temperature, an amount of rainfall per time unit, a degree of moisture, visibility conditions, formation of fog, a road class, traffic density (for example a distance between extraneous vehicles in front of/next to/behind the vehicle or a number of overtaking/overtaken extraneous vehicles per time unit), a speed limit (which is sensed, for example, by means of a road sign recognition operation carried out with a camera), and a categorization of the surrounding countryside. In other words, these environmental conditions, on which the parameters are dependent, are intended to comprise any condition of the environment which has an influence on the longitudinal guidance of the vehicle during the journey across the respective section.

A state of the driver.

The state of the driver may be, for example, aggressive, tired, drunk, exhausted or relaxed. By taking into account the state of the driver, the predicted longitudinal guidance of the vehicle can be predicted even better.

A vehicle information item which describes the vehicle and/or a state of the vehicle. Such information comprises, for example, the vehicle model of the vehicle, a driving mode selection (for example sporty or economical in the case of an automatic transmission) and an infotainment setting. The states of the vehicle comprise, for example, the current speed of the vehicle, an accelerator pedal angle, an engine torque, an engine speed and a steering angle of the vehicle.

A driving style of the driver.

A driving style of the driver can also comprise, for example, a sporty driving style or a defensive driving style, independently of the state of the driver.

Properties of the vehicle.

The properties are dependent, in particular, on the vehicle type and define, for example, the driving comfort, the motorization and the energy consumption of the vehicle per kilometer.

Features of the section.

The features of the section of the route relate, in particular, to the road topology and describe, for example, the road class (for example freeway), the area surrounding the section (for example urban area or surrounding countryside) and traffic regulations to be observed on the section (for example speed limit).

A time of day at which the vehicle travels on the respective section of the route.

The parameters can also be dependent on the time of day since the driver behaves differently in the morning than in the evening, for example.

A specific position on the route.

Given a specific position (for example the position of a specific intersection) the parameters can have specific values which are dependent on the position, where in the intersection is defined by means of a specific identification or by means of the location (for example degrees longitude and degrees latitude).

In at least one disclosed embodiment, for at least one of the previously described information items a parameter set is produced which comprises the previously described parameters. Of course, it is better if a parameter set is respectively determined for a plurality of information items or for a plurality of combinations (at best all the appropriate combinations) of the previously described information items. In this case, a parameter set is respectively present for a plurality of combinations composed of specific environmental conditions, vehicle information items, a state of the driver and a driving style of the driver. To determine the expected speed-time profile for the respective section, the most suitable parameter set on the basis of the current context, that is to say on the basis of the detected environmental conditions, vehicle information, state of the driver and driving style, can then be used.

As described previously, it is advantageous if a parameter set is determined for each driver and each section type. Therefore, a parameter set is respectively determined according to the previously described embodiment for a plurality of combinations composed of environmental conditions, vehicle information, a state of the driver, a driving style of the driver, a driver and a section type. The method for determining the predicted longitudinal guidance determines the current environmental conditions, the current vehicle information, the current state of the driver, the current driving style of the driver, the driver and the section type of the section of the route currently being traveled through, and determines as a function thereof the corresponding parameter set which is then used to determine the predicted longitudinal guidance.

The method for determining the predicted longitudinal guidance will be explained once more below from a different point of view. The method is essentially composed of three method parts:

1. A journey context is determined from different information sources. These information sources may be, on the one hand, vehicle sensors and, on the other hand, receiver units via which, in particular, traffic information or weather information can be acquired via the Internet or via a Car2X communication. The journey context is composed essentially of environmental conditions, vehicle information, state of the driver and driving style.
2. During the vehicle's journey, the driver-specific and context-related longitudinal guidance behavior is learnt on the basis of the driver behavior (for example acceleration behavior) and the determined journey context and is stored in the parameters.

3. Before or during the journey, the learnt longitudinal guidance behavior is respectively used for the journey context applicable on future route sections, to predict in this way the effects of the specific driver behavior, for example in respect of energy consumption of the vehicle and duration of the journey.

A system for determining parameters of a model of predicted longitudinal guidance of a vehicle is also disclosed. In this context, the system comprises control means, storage means for storing the parameters and, if appropriate, further information, and sensors of the vehicle. The further information comprises, for example, information on which the parameters are dependent, for example environmental conditions, a state of the driver, vehicle information, a driving style of the driver, properties of the vehicle, road features, the time of day and the current position. The system is configured to detect a section of a route of the driver using the sensors, to detect an actual speed-time profile of the vehicle when driving through the section and to determine the parameters as a function of the actual speed-time profile. In this context, the section has a predetermined section type and a reference speed-time profile which is dependent on the section type. An expected speed-time profile for a section of the route corresponding to the section type can be determined on the basis of the reference speed-time profile, using the parameters which can, in particular, also be dependent on the previously described further information items.

Furthermore, a further system for determining predicted longitudinal guidance for a vehicle is disclosed. In this context, the further system comprises control means, an input device for predefining a route of the vehicle and an output device to output the longitudinal guidance. The route runs from a current position of the vehicle to a target position of the route. The further system is configured to divide the route into sections using the control means, wherein each section is assigned to a predetermined section type. Furthermore, each section is assigned a reference speed-time profile which depends on the section type of the respective section. The further system is configured to determine an expected speed-time profile for each section using the control means in that the control means provides the reference speed-time profile of the respective section with parameters, which are dependent on a current driver or have been learnt for the current driver, as a result to determine the expected speed-time profile of the respective section. The further system is also configured to determine, by means of the control means, the longitudinal guidance by means of the expected speed-time profiles of (in particular of all of) the sections of the route.

Finally, a vehicle is disclosed which comprises a system according to the disclosed embodiments and/or a further system according to the disclosed embodiments\.

By determining the parameters of the model of predicted longitudinal guidance of the vehicle, as it were driver-specific vehicle longitudinal guidance is modeled, which can be part of comprehensive, complex vehicle modeling. Since the longitudinal guidance of the vehicle decisively influences, for example, the drive train of the vehicle and the energy consumption of the vehicle, but also, for example, the travel time of the vehicle along a route, control operations of the drive train, optimization of the energy consumption of the vehicle and determination of the travel time to deal with a predefined route of the vehicle can advantageously be improved with the present disclosure.

Furthermore, disclosed embodiments can be used to produce a driver model for application during automatic driving of the vehicle, or for modeling real traffic or for range prediction during traffic simulation.

Disclosed embodiments permit efficient storage of the information necessary to determine the predicted longitudinal guidance (in particular parameters and reference speed-time profile) as well as computationally efficient processing of this information and nevertheless permits a high level of accuracy of the predicted longitudinal guidance. The model makes it possible that it is easily learnt and/or adapted during the journey. Furthermore, the disclosed embodiments can easily be extended to additional context dimensions (additional environmental conditions or vehicle information).

Disclosed embodiments permit longitudinal guidance behavior to be learnt adaptively during a journey and for what is learnt to be applied efficiently, to predict very precisely the longitudinal guidance of the vehicle.

Disclosed embodiments can be used, in particular, in motor vehicles. Of course, the disclosed embodiments are not restricted to this field of application since the disclosed embodiments can also be used in ships, aircraft and rail-bound or track-guided vehicles. Furthermore, the disclosed embodiments can also be used outside a means of locomotion, for example for traffic planning.

FIG. 1 is a schematic illustration of a vehicle 10 and of a driver of the vehicle 14. Dynamic surroundings 7 of the vehicle 10 are detected with surroundings sensors 3 which are, for example, laser-assisted. In this context, the dynamic surroundings 7 comprise, for example, the vehicle traffic around the vehicle 10, which includes vehicles traveling ahead and laterally traveling vehicles. Furthermore, the dynamic surroundings 7 comprise the state of a road intersection with or without a traffic light system and a dynamic speed limitation (caused, for example, by moving road works). With a receiver unit 2, the static surroundings 8 of the vehicle 10 can be detected, and also dynamic surroundings information by means of Car2-X communication, for example. The static surroundings comprise here information about bends along the route, a topography of the route, static speed limitations on the route, a number of lanes and the road class of sections of the route, wherein the road class describes, in particular, the covering of the roadway, the width of the road and the condition of the road in general.

For example, the state of charge of an energy store, the energy consumption of an air-conditioning system of the vehicle 10, the engine speed or other vehicle information items can be detected by means of sensors 12 for detecting internal vehicle states. In a data memory 9 of the vehicle 10, the information which is detected by the sensors 3, 12 and by the receiver unit 2 is stored together with parameters for determining the predicted longitudinal guidance of the vehicle. Parts of a digital road map 13 can also be stored in the memory 9. Predicted longitudinal guidance of the vehicle 10 is determined on the basis of this stored information and the parameters and also as a function of data of a digital road map 13, using a computing unit 1 of the vehicle 10, and, for example, a travel time derived therefrom is displayed to the driver 14 by means of a display unit 4 of the vehicle 10.

Figure 2:
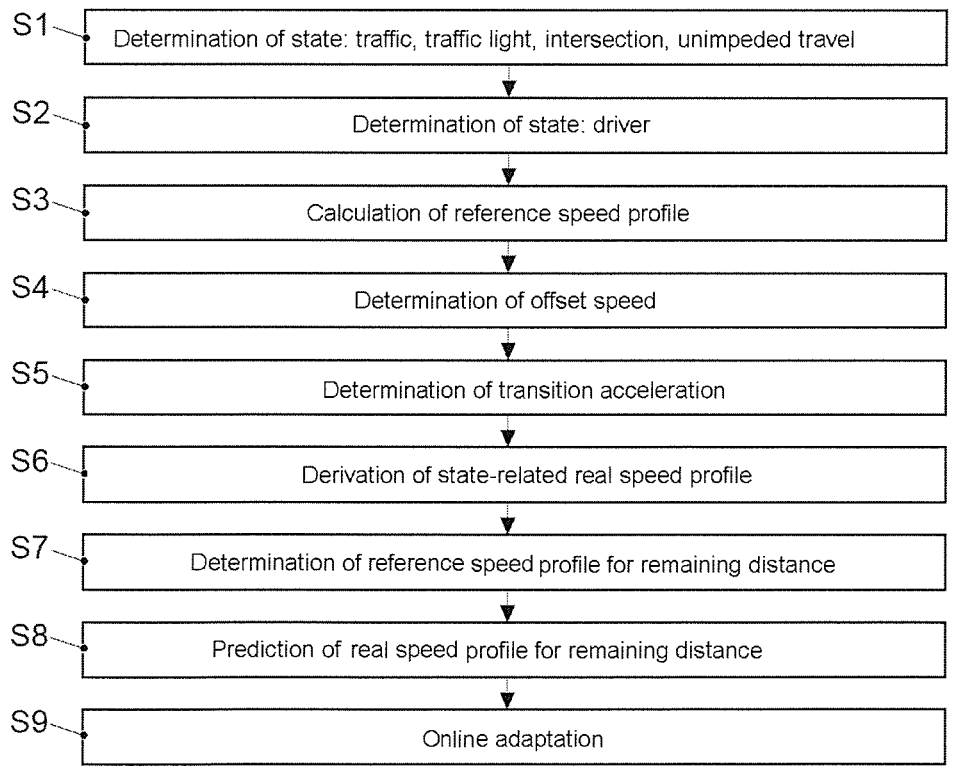
FIG. 2 illustrates a flowchart of a method for determining predicted longitudinal guidance.

FIG. 2 illustrates a flowchart of a method for determining the predicted longitudinal guidance of the vehicle 10.

In a first step S1, the current driving state is determined in that a current section of the route of the vehicle is detected. In other words, in step S1 the current position of the vehicle 10 and therefore the section of the route currently being traveled along by the vehicle 10 is determined, for example, using a GPS receiver or by means of odometry. Such a section has a section type which, in the illustrated example, can be of the traffic, traffic light, intersection or unimpeded travel type.

In the second step S2, the state of the driver is determined, for example, by means of a camera located in the passenger compartment of the vehicle 10.

In the third step S3, the reference speed profile or the reference speed-time profile is determined for the current section on the basis of the section type to which the current section is assigned.

On the basis of the actual speed-time profile which is detected when the current section is driven through, in step S4 the offset speed and in step S5 the transition acceleration are determined and a state-related real speed profile is then derived therefrom in the following step S6. To be more precise, in step S6 those parameters with which an expected speed-time profile can be determined on the basis of the reference speed-time profile are determined or adapted on the basis of the determined offset speed and transition acceleration.

In the subsequent step S7, the sections and the section types associated with the respective section are determined for the remaining distance, i.e. for the route from the current position of the vehicle 10 up to a predetermined target position, and the reference speed-time profiles of all the sections of the route or remaining distance can then be determined as a function of the sections and section types. In other words, in step S7 a reference speed profile of the remaining distance, which is composed as it were of the juxtaposed reference speed-time profiles, is determined.

With the parameters which are determined or adapted in step S6, the expected speed-time profiles of all the sections of the route are then determined on the basis of this reference speed profile or the reference speed-time profiles of all the sections in step S8, which corresponds to a prediction of an (expected) real speed profile of the remaining distance. On the basis of this real speed profile of the remaining distance it is then possible, for example, to calculate the expected travel time for the remaining distance or route.

In step S9, there is, as it were, online adaptation of the expected speed-time profiles in that, in particular for each section of the route currently being traveled on, the corresponding parameters are adapted by means of the corresponding determination of the offset speed and transition acceleration.

Figure 4:
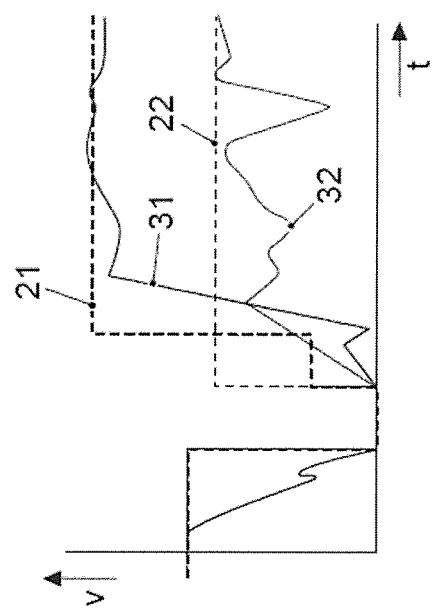
FIG. 4 illustrates reference speed-time profiles and actual speed-time profiles for two different section types.
Figure 3:
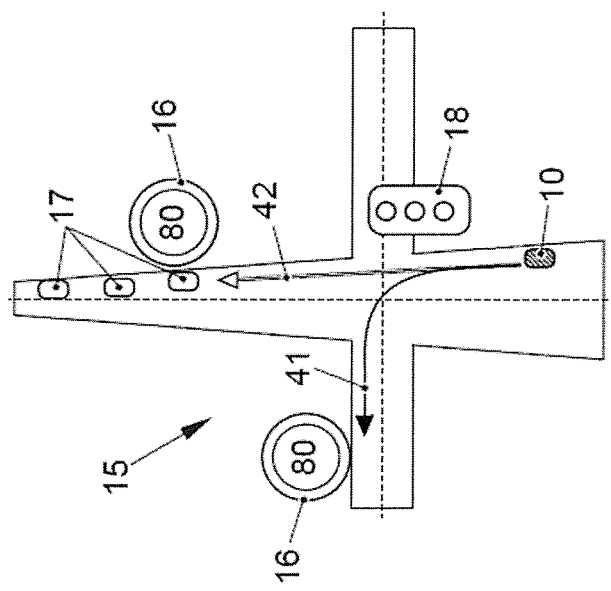
FIG. 3 illustrates an intersection with a traffic light system.

FIGS. 3 and 4 are intended to explain the disclosed embodiments in detail. Here, FIG. 3 shows an intersection 15 with a traffic light system 18. The reference number 41 represents a section of the route which is of the traffic light section type and of the left-handed bend subtype. In contrast, the reference number 42 represents a section of the route which is also of the traffic light section type, but this time of the straight-ahead travel subtype. In both sections 41, 42 there is a road section with a speed limit 16 of 80 km/h after the intersection 15. However, while a section of the "unimpeded travel" section type follows the section after the left-handed bend 41, the section 42 is followed by a section of the "traffic" section type since there are extraneous vehicles 17 on this section.

FIG. 4 illustrates, on the one hand, the reference speed-time profiles 21, 22 which correspond at least partially to the sections 41, 42 and, on the other hand, the associated actual speed-time profiles 31, 32.

The reference speed-time profile 21 is composed of a reference speed-time profile of the traffic light section 41 and a reference speed-time profile of a subsequent section of the "unimpeded travel" section type. It is apparent that the reference speed-time profile of the traffic light section 41 assumes that the vehicle is approaching the traffic light 18 at a speed of 50 km/h, wherein the vehicle 10 then remains stationary at the traffic light 18 for a specific time period. After the traffic light 18 has changed to green, the vehicle 10 drives through the left-handed bend at an assumed speed of 15 km/h. The reference speed-time profile of the "unimpeded travel" section adjoining the reference speed-time profile of the traffic light section 41 assumes that the vehicle 10 is moving at a speed of 80 km/h, which corresponds to the specified maximum speed 16.

If the reference speed-time profile 21 is compared with the actual speed-time profile 31, it is apparent that the speed of the vehicle 10 before the traffic light is approximately 50 km/h, that the speed of the vehicle 10 when driving through the left-handed bend is on average approximately 5 km/h and that the speed of the vehicle 10 within the "unimpeded travel" section is approximately 80 km/h. Accordingly, from this example the offset speed could be derived as being 0 km/h before the traffic light 18, as −10 km/h when driving through the left-handed bend, and in turn as 0 km/h for the "unimpeded travel" section. In a similar way, transition accelerations could be derived from the actual speed-time profile 31, the transition accelerations describing how the vehicle 10 comes to a standstill before the traffic light 18 and the acceleration with which the vehicle 10 accelerates out of the stationary state to drive through the left-handed bend, and after driving through the left-handed bend.

The reference speed-time profile 22 is composed, on the one hand, of the reference speed-time profile for the traffic light section 42 and, on the other hand, of the reference speed-time profile for the subsequent traffic section. It is apparent that the reference speed-time profile 22 up to the switching of the traffic light 18 to green corresponds to the reference speed-time profile 21. After the switching of the traffic light 18 to green, the reference speed-time profile 22 assumes that the vehicle 10 is moving at a speed of 40 km/h on the basis of the extraneous vehicles 17.

If the actual speed-time profile 32 is compared with the reference speed-time profile 22, the same considerations as in the case of the reference speed-time profile 21 apply up to the switching of the traffic light 18 to green. However, the actual speed in the traffic section is only on average 30 km/h, with the result that an offset speed of −10 km/h comes about. In turn, transition accelerations can be derived from the actual speed-time profile 32, as has already been described above.

Figures 5, 6, 7:
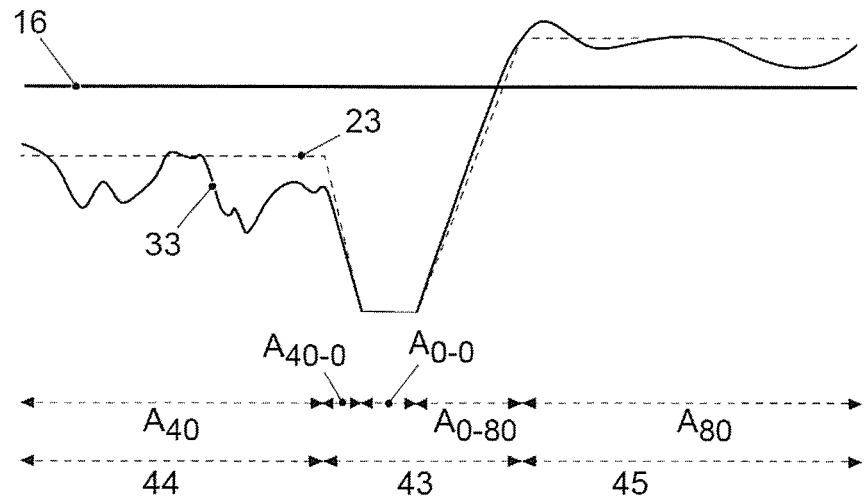
FIG. 5 illustrates various parameters describing a transition acceleration.
FIG. 6 illustrates various parameters describing an offset speed.
FIG. 7 illustrates an expected speed-time profile contrasted with an actual speed-time profile.

In the table illustrated in FIG. 5, transition accelerations, which have been previously determined by evaluating corresponding actual speed-time profiles, are stored for a specific context which is defined, for example, on the basis of a combination of environment states, driver information items, state of the driver and driver. In this context, in the illustrated table the corresponding transition accelerations Ax-y are stored for specific speed transitions from a starting speed Vs to a target speed Vz. For example, the parameter A10-20 indicates the acceleration with which the vehicle accelerates in the specific context from 10 km/h to 20 km/h. In a similar way, the parameter A20-0 indicates the negative acceleration with which the vehicle brakes in the specific context from a speed of 20 km/h to the stationary state.

In the table illustrated in FIG. 6, in turn offset speeds, which have been previously determined for specific speed-time profiles, are stored for a specific context. In this context, the parameters A10, A20 indicate for the specific context the extent to which the vehicle 10 on a section with a speed which is constant according to a reference speed-time profile deviates from this speed. For example, the parameter A10 indicates the extent to which the vehicle 10 on, for example, a section which is driven through at a constant speed of 10 km/h according to the reference speed-time profile will be expected to deviate from this speed.

FIG. 7 illustrates an expected speed-time profile 23 which is composed of an expected speed-time profile for a section 44 of the traffic section type, of an expected speed-time profile for a section 43 of the traffic light section type and of an expected speed-time profile for a section 45 of the "unimpeded travel" section type. A speed limit 16 applies here on all the sections 43-45.

To determine the expected speed-time profile for the section 44, the associated reference speed-time profile of the traffic section type with the parameter A40 was adapted to the current context. For this purpose, the parameter A40 is added to the speed of 40 km/h, which is prescribed for the section 44 by the associated reference speed-time profile, to determine the speed applicable for the section 44 according to the expected speed-time profile 23, as is illustrated in FIG. 7. In a similar way, the parameter A80 is added to the speed of 80 km/h, which is prescribed for the section 45 of the associated reference speed-time profile, to determine the speed applicable for the section 45 according to the expected speed-time profile 23.

The parameter A40-0 indicates the transition acceleration for the current context to brake, from the speed of 40 km/h predefined according to the associated reference speed-time profile, to the stationary state likewise predefined according to the associated reference speed-time profile. In a similar way, the parameter A0-80 indicates the transition acceleration for the current context to accelerate from the stationary state, predefined according to the associated reference speed-time profile, during the switching over of the traffic light, to the speed of 80 km/h, likewise predefined according to the associated reference speed-time profile. In other words, the sudden transitions in the reference speed-time profiles 21, 22 (see, for example, FIG. 4) are converted by the parameters A40-0, A0-80, which each represent a transition acceleration, into the transitions in the expected speed-time profile 23 which occur obliquely and linearly.

In addition, in FIG. 7 the actual speed-time profile 33 is entered, the speed-time profile 33 showing that the expected speed-time profile 23 already comes very close to reality (i.e. the actual speed-time profile 33).

Figure 8:
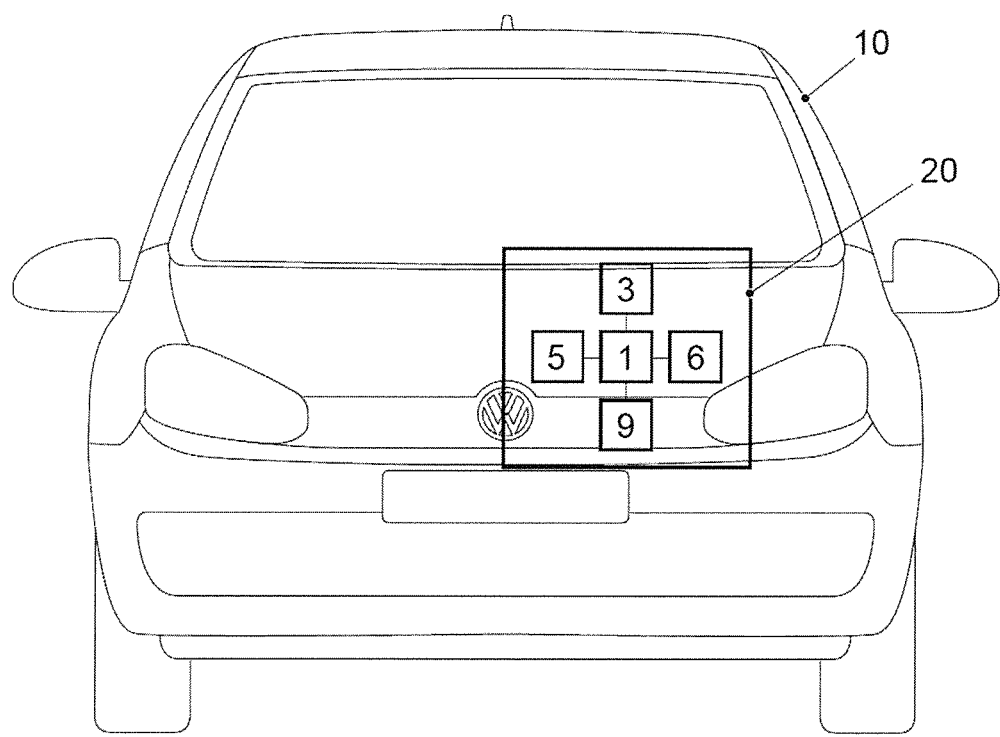
FIG. 8 shows a vehicle with the system disclosed herein.

Finally, FIG. 8 illustrates a vehicle 10 with a system 20, which system 20 is configured, on the one hand, to determine parameters of a model of predicted longitudinal guidance of the vehicle 10 and, on the other hand, to determine the predicted longitudinal guidance itself. The system comprises not only a computing unit 1 but also surroundings sensors 3 (in particular a GPS receiver), an input device 5, an output device 6 and a memory 9. For example the driver of the vehicle 10 can predefine the destination of the route by means of the input device 5. The parameters which are adapted to the driving behavior as a function of the current context are stored in the memory 9. For example an expected journey duration for dealing with a route from the current position of the vehicle 10 to the predefined destination can be output by means of the output device 6.

DE 10 2012 003 292 A1 discloses a method for making available a navigation function in a motor vehicle. Here, a predicted residual range is displayed as a function of previously determined parameter sets.

DE 103 43 178 A1 describes a driver assistance system with a variable longitudinal guidance strategy. In this context, the driver behavior is detected by a learning module and a stored longitudinal guidance strategy is selected on the basis of the detected driver behavior.

DE 10 2009 039 774 A1 relates to the control of a motor vehicle to switch on and off and/or set driving functions and/or performance features. In this context, the driving ability of the driver is determined, and a performance feature and/or a driving function is activated or deactivated as a function thereof.

The longitudinal guidance of a vehicle describes how the vehicle moves in the direction of its longitudinal axis, that is to say in the forward and rearward directions of the vehicle. The longitudinal guidance of the vehicle therefore depends on the acceleration (negative and positive) of the vehicle and on the speed of the vehicle. On the basis of the (predicted) longitudinal guidance, it is, in other words, possible to determine, for example, when the vehicle will be at which location on a predefined route. The more precise the longitudinal guidance or the better the predicted longitudinal guidance of the vehicle, the better the specification of the expected journey duration to a destination or the expected range as a function of a quantity of energy present in the vehicle. Furthermore, in the case of a hybrid vehicle the hybrid strategy, with which it is decided, for example, when the electric motor will be used to drive the vehicle, can be regulated better the more precise the knowledge about the predicted longitudinal guidance of the vehicle.

The present invention improves the determination of the predicted longitudinal guidance of a vehicle compared to the prior art.

LIST OF REFERENCE SYMBOLS

1 Computing unit
2 Receiving unit
3 Surroundings sensors
4 Display unit
5 Input device
6 Output device
7 Dynamic surroundings
8 Static surroundings
9 Memory
10 Vehicle
12 Sensors of internal vehicle states
13 Road map
14 Driver
15 Intersection
16 Speed limit
17 Extraneous vehicle
18 Traffic light system or traffic light
20 System
21,22 Reference speed-time profile
23 Expected speed-time profile
31-33 Actual speed-time profile
41,42 Traffic light section
43 Traffic light section
44 Section with traffic
45 Section with unimpeded travel
$A_x, A_{x-y}$ Parameter
$S_1$-$S_9$ Method step

The invention claimed is:

1. A method for determining parameters of a model of predicted longitudinal guidance of a vehicle under control of a controller, the method comprising:

detecting a section of a route of the vehicle using sensors of the vehicle, wherein the route runs from a current position of the vehicle to a target position of the route;

detecting an actual speed-time profile of the vehicle when driving through the section; and determining the parameters as a function of the actual speed time profile, wherein a predetermined section type and a reference speed-time profile, which is dependent on the section type, are assigned to the section, wherein an expected speed time profile is determined with the parameters based on the basis of the reference speed time profile, wherein the parameters are dependent on a current driver, to determine the expected speed time profile of a respective section, and wherein the parameters comprise at least one parameter from a parameter group comprising: an offset speed which indicates, for the respective section, a deviation from a constant speed within the reference speed time profile of the respective section, and a transition acceleration, which indicates an acceleration for the respective section to accelerate, within the respective section, from a first specific speed of the vehicle to a second specific speed of the vehicle.

2. The method of claim 1, wherein the parameters are dependent on a driver of the vehicle and/or on the section type.

3. A method for determining predicted longitudinal guidance for a vehicle under control of a controller the method comprising:

determining a route of the vehicle, wherein the route runs from a current position of the vehicle to a target position of the route;

dividing the route into sections, wherein each of the sections is assigned to a predetermined section type, wherein each section is assigned a reference speed time profile which is dependent on the section type of the respective section;

determining an expected speed time profile for each of the sections, in that the reference speed time profile of the respective section is provided with parameters, which are dependent on a current driver, to determine the expected speed time profile of a respective section; and determining the longitudinal guidance based on the expected speed time profiles of the sections of the route, wherein the parameters comprise at least one parameter from a parameter group comprising: an offset speed which indicates, for the respective section, a deviation from a constant speed within the reference speed time profile of the respective section, and a transition acceleration, which indicates an acceleration for the respective section to accelerate, within the respective section, from a first specific speed of the vehicle to a second specific speed of the vehicle.

4. The method of claim 3, wherein the parameters are dependent on the section type.

5. The method of claim 3, wherein the determination of the expected speed-time profile comprises:

detecting a current section of the route of the vehicle using sensors of the vehicle;

detecting an actual speed-time profile of the vehicle when driving through the current section; and adapting the parameters as a function of the actual speed-time profile.

6. The method of claim 3, wherein the section types comprise at least one from a section type group, wherein the section type group comprises:

a traffic light section type;

an intersection section type;

a section type which represents a section on which the vehicle can travel; unimpeded and a section type which represents a section on which the vehicle is impeded by other vehicles.

7. The method of claim 3, wherein the parameters are determined as a function of at least one information item from an information group, wherein the information group comprises:

an environment condition which applies when the vehicle is traveling on the respective section;

a state of the driver;

a vehicle information item which describes the vehicle and/or a state of the vehicle;

a driving style of the driver;

properties of the vehicle;

features of the section;

a time of day at which the vehicle travels on the respective section; and a specific position on the route.

8. The method of claim 7, wherein, for a plurality of section types, there are in each case a plurality of parameter sets, wherein each of the parameter sets comprises the parameters in order to determine the expected speed-time profile for the respective section starting from the reference speed-time profile, and in that in each case one of these parameter sets is created for at least one information item or for at least one combination of the information items from the information group.

9. A system for determining parameters of a model of predicted longitudinal guidance of a vehicle, the system comprising:

a controller;

storage for storing the parameters; and sensors of the vehicle, wherein the system is configured to detect a section of a route of the vehicle using the sensors, to detect an actual speed-time profile of the vehicle when driving through the section and to determine the parameters as a function of the actual speed-time profile, wherein the route runs from a current position of the vehicle to a target position of the route, wherein the section is assigned to a predetermined section type and a reference speed-time profile which is dependent on the section type, and wherein an expected speed-time profile is determined based on the reference speed-time profile with parameters, which are dependent on a current driver, to determine the expected speed-time profile of a respective section, wherein the longitudinal guidance is determined based on the expected speed-time profiles of the sections of the route, and wherein the parameters comprise at least one parameter from a parameter group comprising: an offset speed which indicates, for the respective section, a deviation from a constant speed within the reference speed-time profile of the respective section, and a transition acceleration, which indicates an acceleration for the respective section in order to accelerate, within the respective section, from a first specific speed of the vehicle to a second specific speed of the vehicle.

10. A system for determining predicted longitudinal guidance for a vehicle, the system comprising:

controller;

an input device configured to predefine a route of the vehicle; and an output device configured to output the longitudinal guidance, wherein the route runs from a current position of the vehicle up to a target position of the route, wherein, under the direction of the controller, the system is configured to divide the route into sections, wherein each section is assigned to a predetermined section type, wherein each section is assigned a reference speed-time profile which is dependent on the section type of a respective section, wherein the system, under the control of the controller, is configured to determine an expected speed-time profile for each section and provides the reference speed-time profile of the respective section with parameters, which are dependent on a current driver, to determine the expected speed-time profile of the respective section, wherein the system is configured to determine, under the direction of the controller, the longitudinal guidance using the expected speed-time profiles of the sections of the route, and wherein the parameters comprise at least one parameter from a parameter group comprising: an offset speed which indicates, for the respective section, a deviation from a constant speed within the reference speed-time profile of the respective section, and a transition acceleration, which indicates an acceleration for the respective section to accelerate, within the respective section, from a first specific speed of the vehicle to a second specific speed of the vehicle.

11. A vehicle having a system for determining parameters of a model of predicted longitudinal guidance of a vehicle, the system comprising:

a controller;

storage for storing the parameters; and sensors of the vehicle, wherein the system is configured to detect a section of a route of the vehicle using the sensors, to detect an actual speed-time profile of the vehicle when driving through the section and to determine the parameters as a function of the actual speed-time profile, wherein the section is assigned to a predetermined section type and a reference speed-time profile which is dependent on the section type, wherein an expected speed-time profile can be determined on the basis of the reference speed-time profile with the parameters, and wherein the parameters comprise at least one parameter from a parameter group comprising: an offset speed which indicates, for a respective section, a deviation from a constant speed within the reference speed-time profile of the respective section, and a transition acceleration, which indicates an acceleration for the respective section to accelerate, within the respective section, from a first specific speed of the vehicle to a second specific speed of the vehicle.

12. A vehicle comprising a system for determining predicted longitudinal guidance for a vehicle, the system comprising:

controller;

an input device configured to predefine a route of the vehicle; and an output device configured to output the longitudinal guidance, wherein the route runs from a current position of the vehicle up to a target position of the route, wherein, under the direction of the controller, the system is configured to divide the route into sections, wherein each section is assigned to a predetermined section type, wherein each section is assigned a reference speed-time profile which is dependent on the section type of a respective section, wherein the system, under the control of the controller, is configured to determine an expected speed-time profile for each section and provides the reference speed-time profile of the respective section with parameters, which are dependent on a current driver, to determine the expected speed-time profile of the respective section, wherein the system is configured to determine, under the direction of the controller, the longitudinal guidance using the expected speed-time profiles of the sections of the route, and wherein the parameters comprise at least one parameter from a parameter group comprising: an offset speed which indicates, for the respective section, a deviation from a constant speed within the reference speed-time profile of the respective section, and a transition acceleration, which indicates an acceleration for the respective section in order to accelerate, within the respective section, from a first specific speed of the vehicle to a second specific speed of the vehicle.

* * * * *